(12) United States Patent
Subbaraman et al.

(10) Patent No.: US 7,963,569 B2
(45) Date of Patent: Jun. 21, 2011

(54) LOCKING PIPE JOINT AND A METHOD OF MAKING THE SAME

(75) Inventors: Narayana Swamy Subbaraman, Chennai (IN); Jaikishan Pohumal Wadhwani, Bhusawal (IN); Ajit Bhavarlal Jain, Jalgaon (IN)

(73) Assignee: Jain Irrigation Systems, Ltd., Jalgaon, Maharashtra (IN)

( * ) Notice: Subject to any disclaimer, the term of this patent is extended or adjusted under 35 U.S.C. 154(b) by 94 days.

(21) Appl. No.: 12/442,384

(22) PCT Filed: Sep. 10, 2007

(86) PCT No.: PCT/IN2007/000406
§ 371 (c)(1),
(2), (4) Date: Mar. 20, 2009

(87) PCT Pub. No.: WO2008/062443
PCT Pub. Date: May 25, 2008

(65) Prior Publication Data
US 2010/0007136 A1    Jan. 14, 2010

(30) Foreign Application Priority Data
Sep. 26, 2006   (IN) .................. 1560/MUM/2006

(51) Int. Cl.
*F16L 37/00* (2006.01)
(52) U.S. Cl. ...... 285/305; 285/321; 285/369; 29/890.14
(58) Field of Classification Search .................. 285/321, 285/305, 417, 369; 29/890.14
See application file for complete search history.

(56) References Cited

U.S. PATENT DOCUMENTS

| | | | | |
|---|---|---|---|---|
| 3,195,928 A | * | 7/1965 | Pasternack | 285/321 |
| 3,326,580 A | * | 6/1967 | Munier et al. | 285/321 |
| 3,563,574 A | * | 2/1971 | Jackson et al. | 285/423 |
| 3,637,239 A | * | 1/1972 | Daniel | 285/321 |
| 3,735,928 A | * | 5/1973 | Watts et al. | 285/305 |
| 4,293,148 A | * | 10/1981 | Milberger | 285/305 |
| 4,697,947 A | * | 10/1987 | Bauer et al. | 285/305 |
| 5,135,264 A | | 8/1992 | Elliott-Moore | |
| 5,350,314 A | | 9/1994 | Saba | |
| 5,390,638 A | * | 2/1995 | Hornby et al. | 285/305 |
| 5,845,945 A | * | 12/1998 | Carstensen | 285/321 |
| 5,857,718 A | | 1/1999 | Kleinschmidt | |
| 5,876,071 A | * | 3/1999 | Aldridge | 285/321 |
| 6,102,447 A | | 8/2000 | Aldridge | |
| 6,913,293 B1 | * | 7/2005 | Filer | 285/305 |
| 7,108,295 B1 | | 9/2006 | Zarynow | |
| 2002/0101078 A1 | | 8/2002 | Robinson | |
| 2004/0154261 A1 | | 8/2004 | Miller | |
| 2006/0201987 A1 | | 9/2006 | Brown | |

FOREIGN PATENT DOCUMENTS

IN   1560/MUM/2006    9/2006
WO   PCT/IN2007/000406    5/2008

* cited by examiner

*Primary Examiner* — David E Bochna
(74) *Attorney, Agent, or Firm* — Burns & Levinson LLP; Orlando Lopez

(57) ABSTRACT

A novel locking pipe joint for use in fluid-carrying pipe systems is described. The locking pipe joint of the present invention provides a system of joints that will withstand the stresses and forces imposed on a pipe system carrying fluids. The joint is constructed on a push-fit principle. Sealing rings are used to make the joint leak-proof. Splines are provided to sustain the longitudinal forces imposed on the joint, and longitudinal ribs are provided on the outer surface of the joined pipes to withstand the torsional loads. The joint is simple in its construction, easy to assemble in field and cost effective.

10 Claims, 9 Drawing Sheets

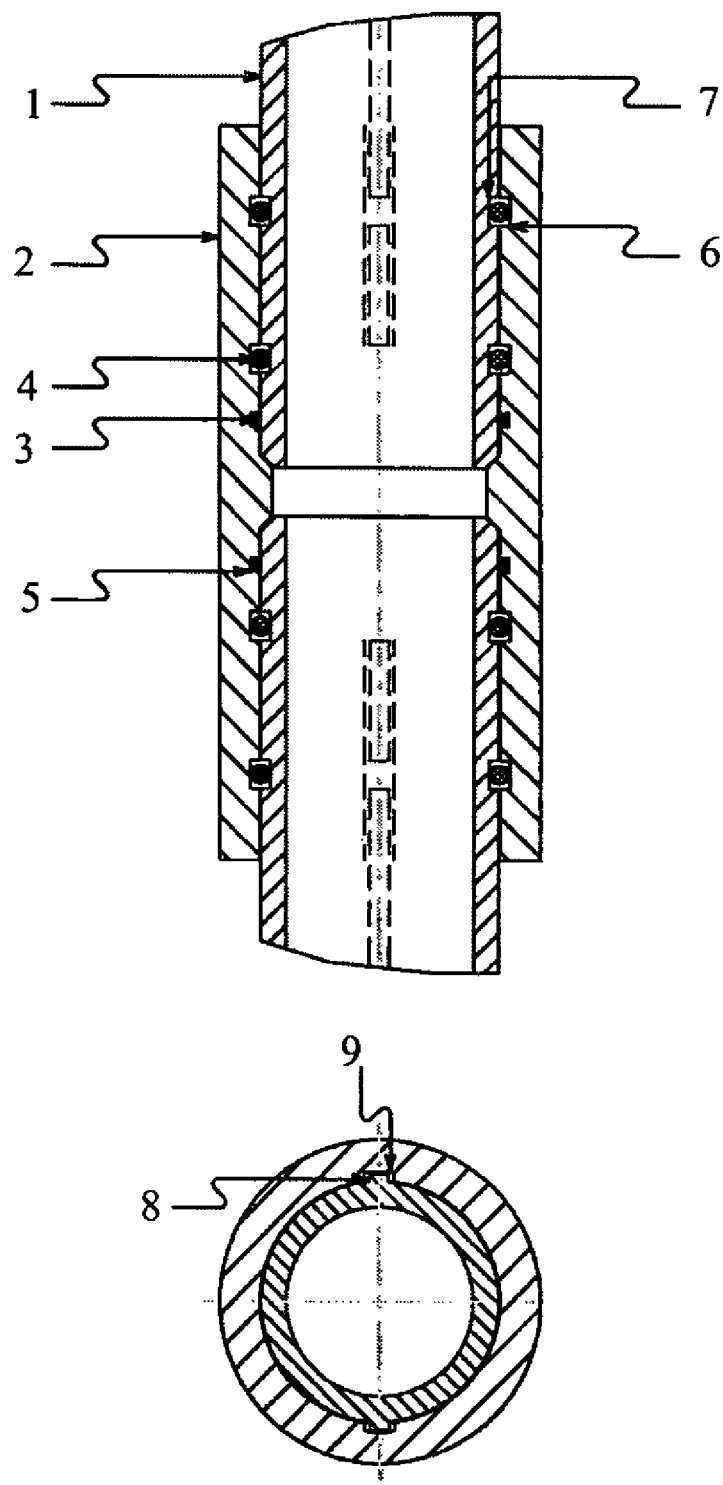
Figure : 1

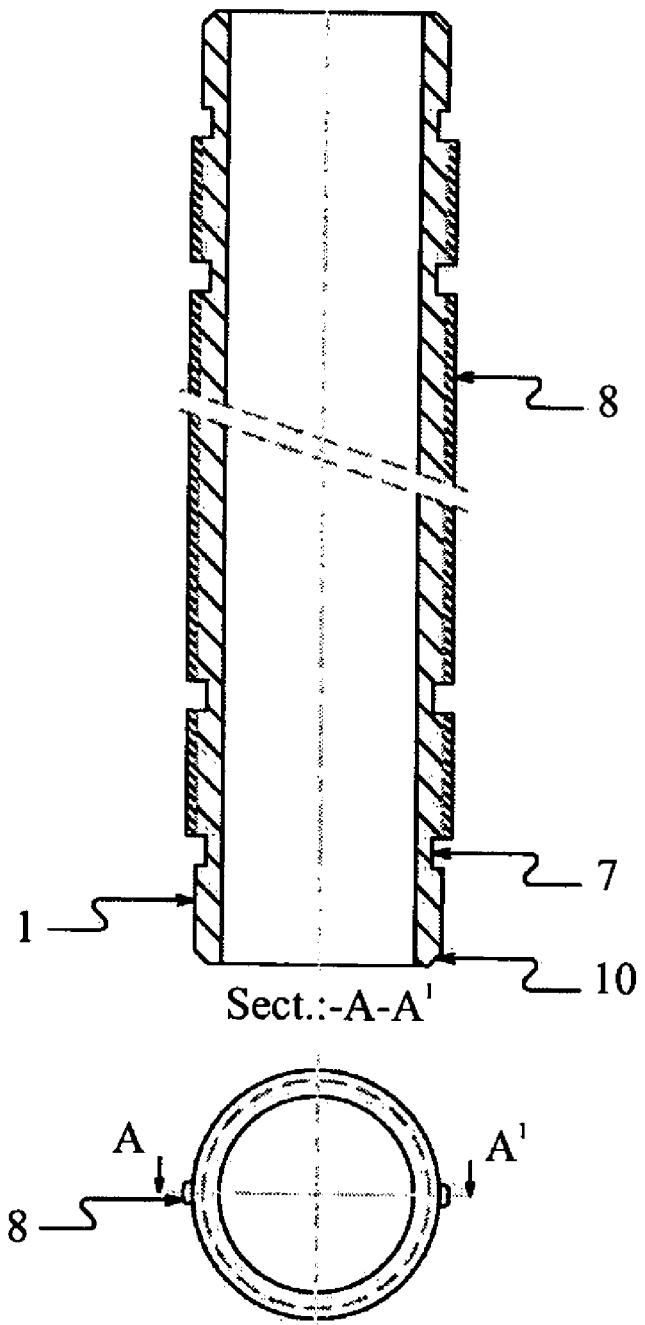
Figure : 2

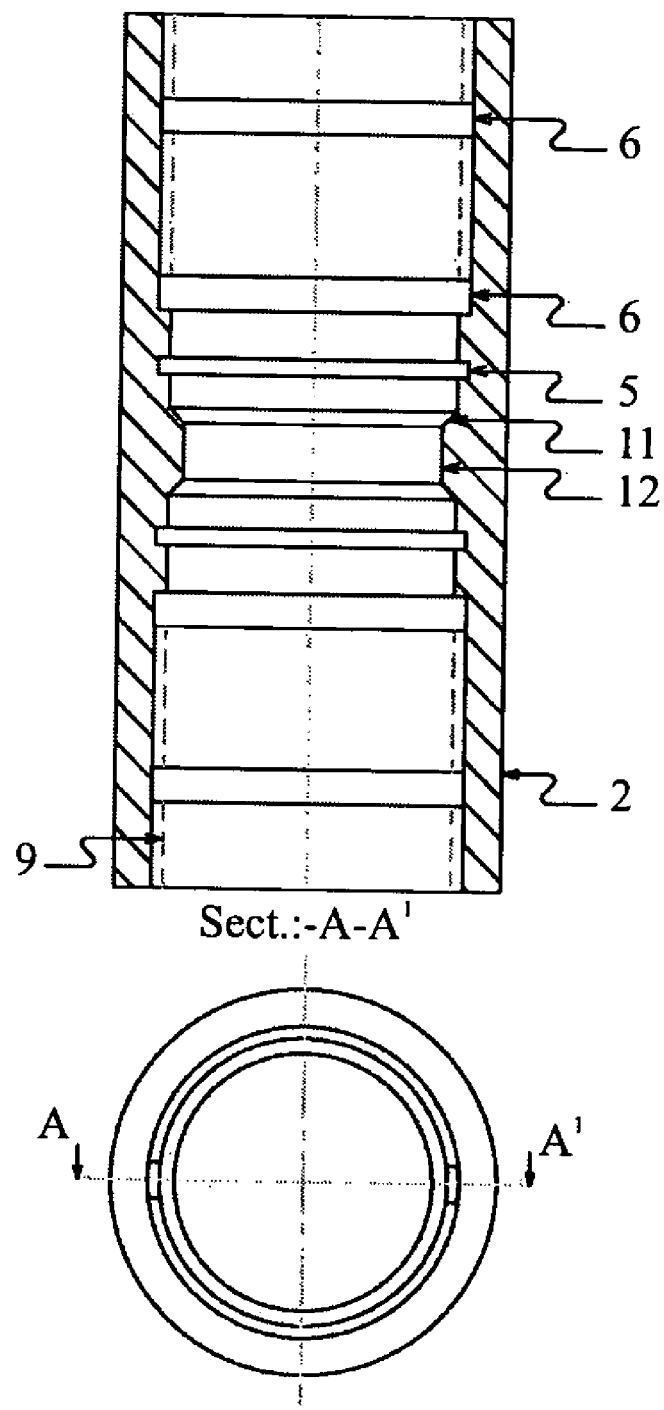
Figure : 3

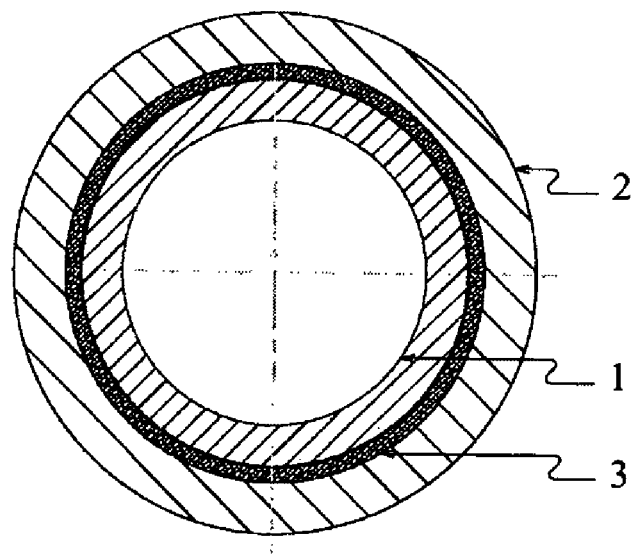
Figure : 4
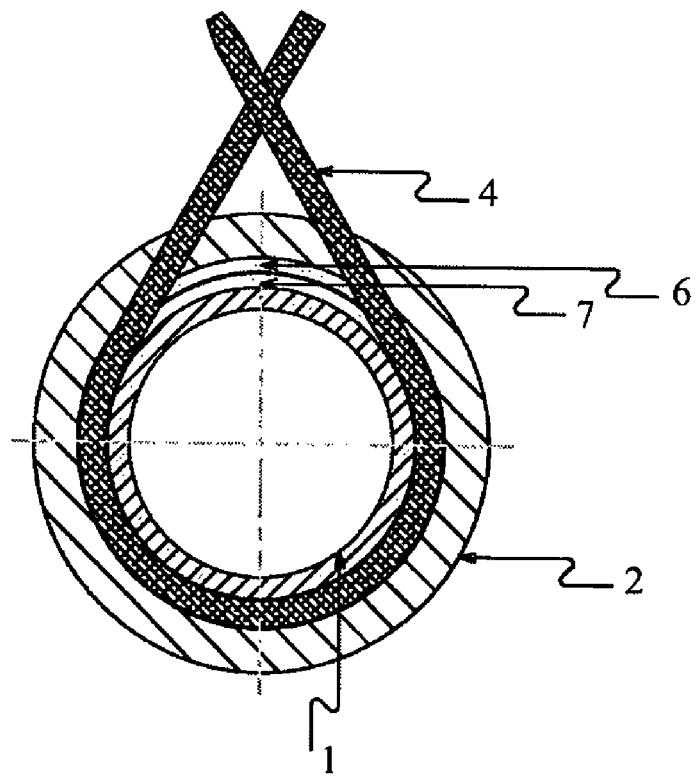
Figure : 5

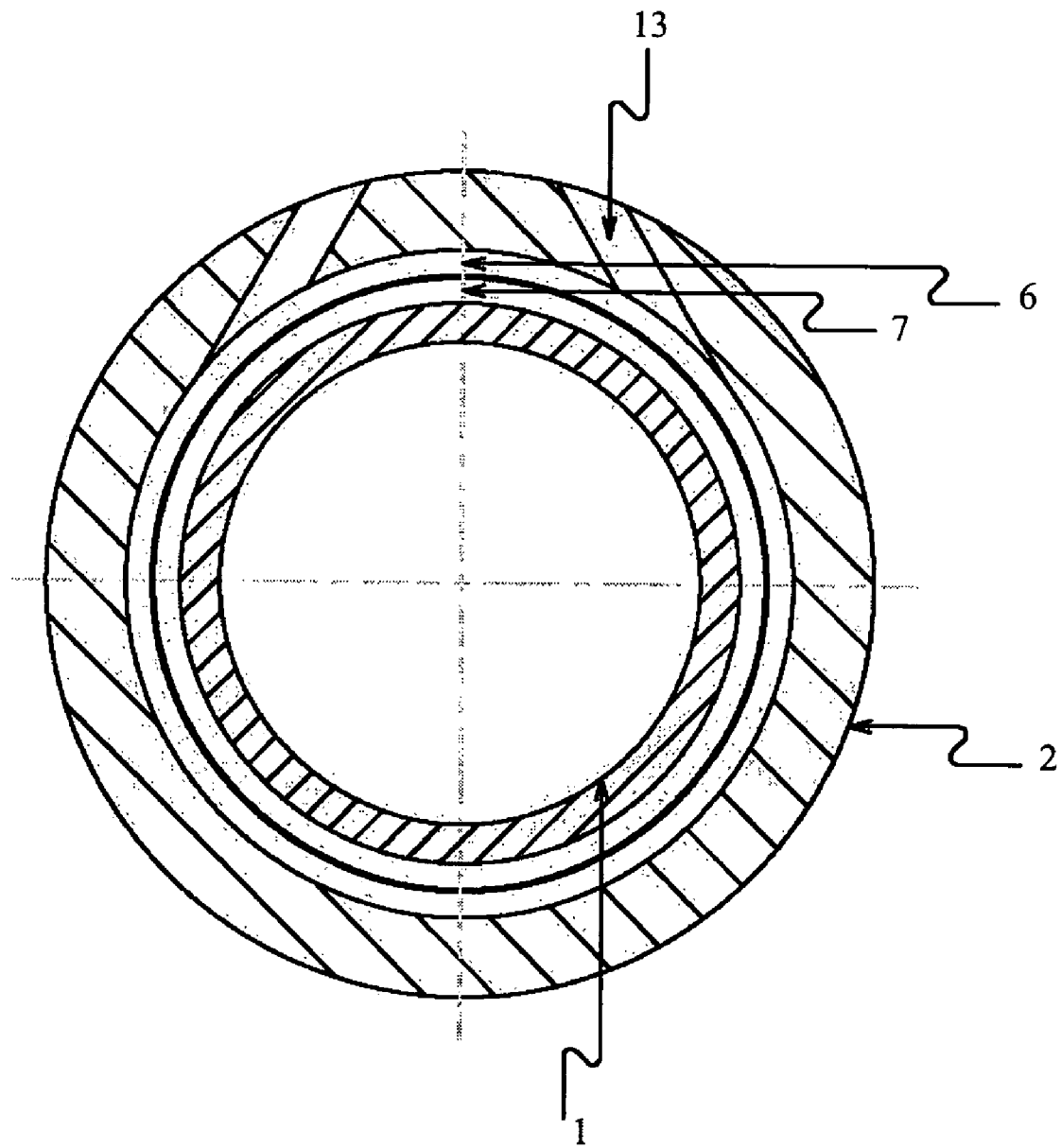
Figure : 6

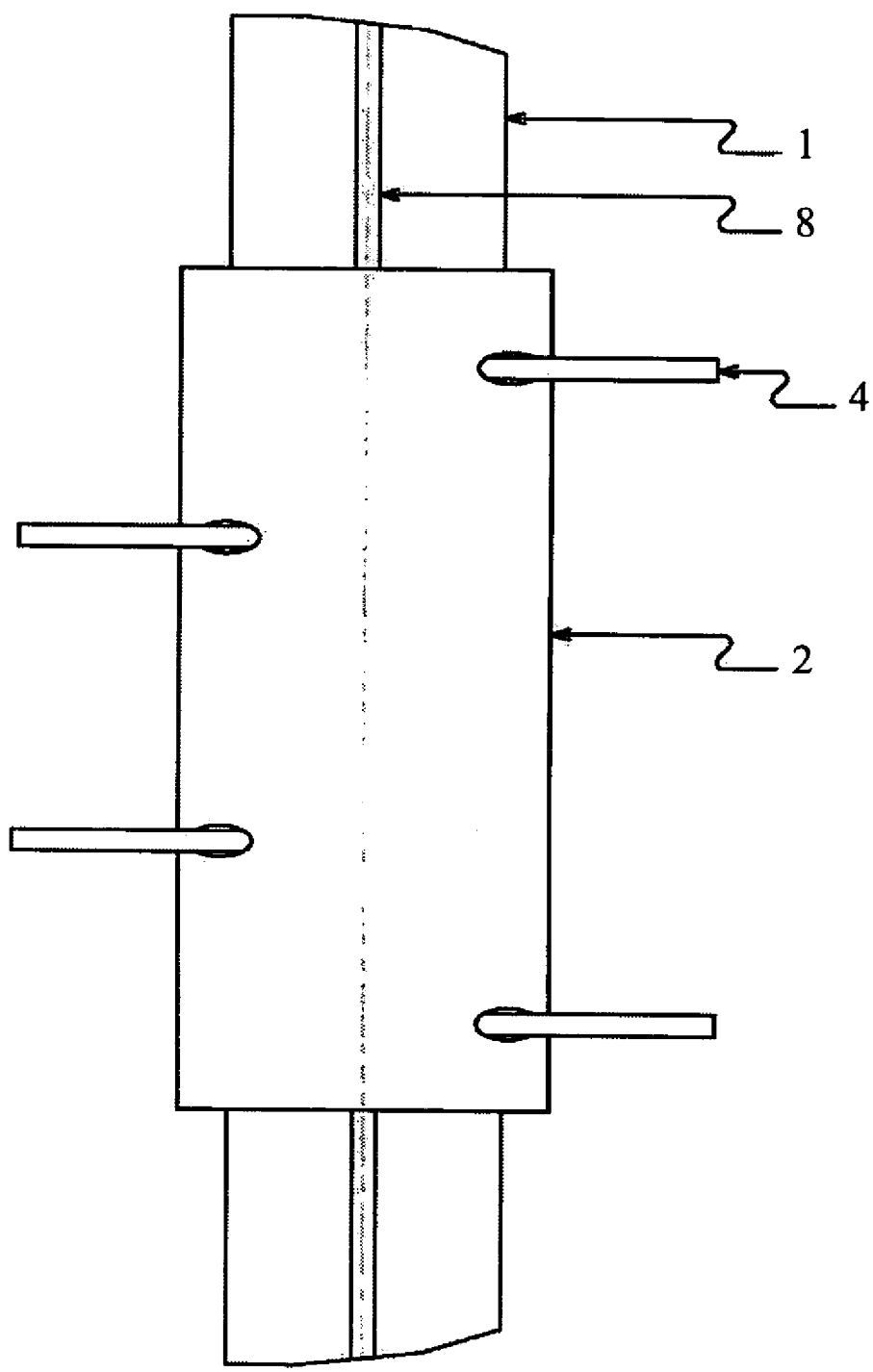
Figure : 7

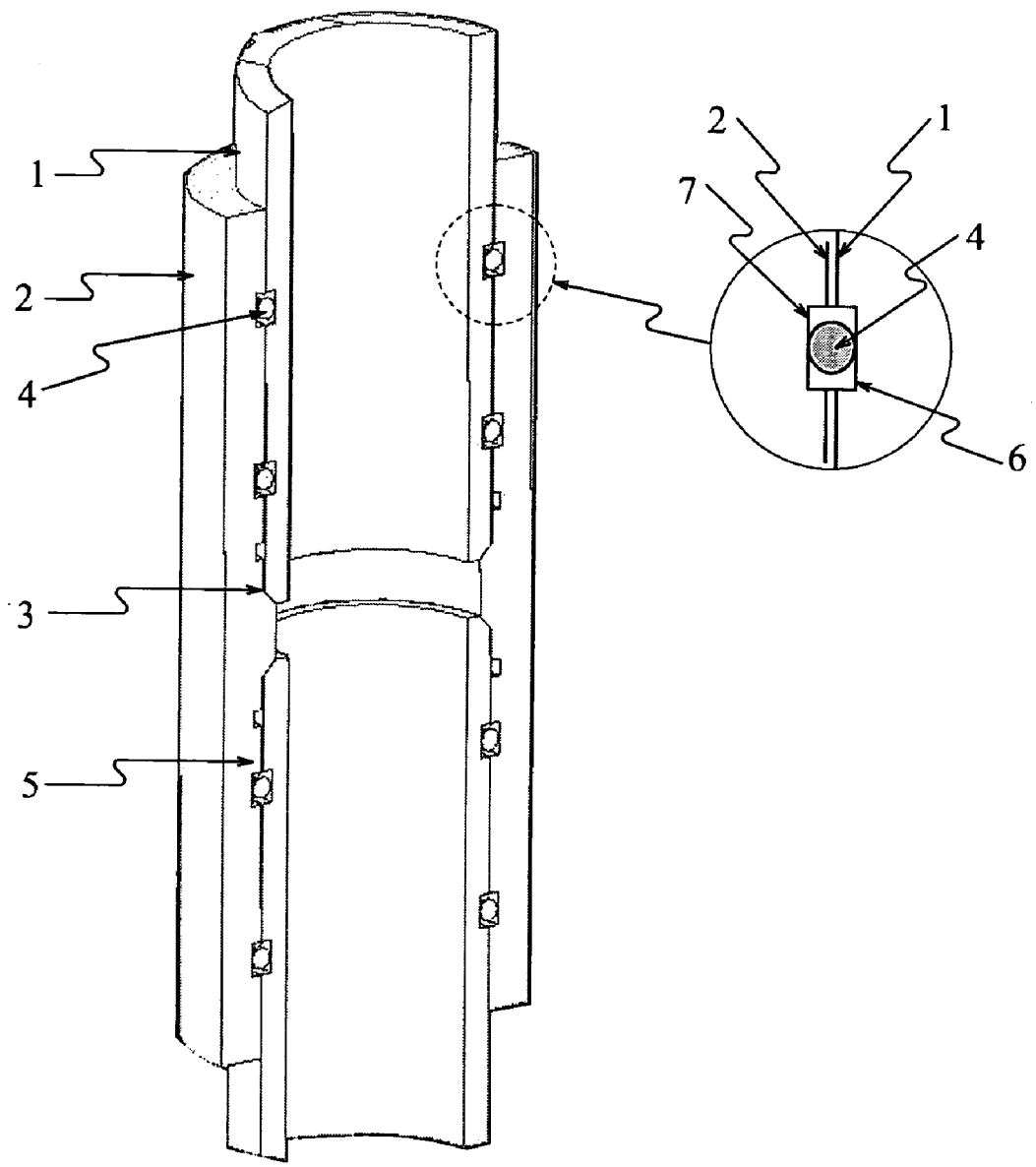
Figure : 8

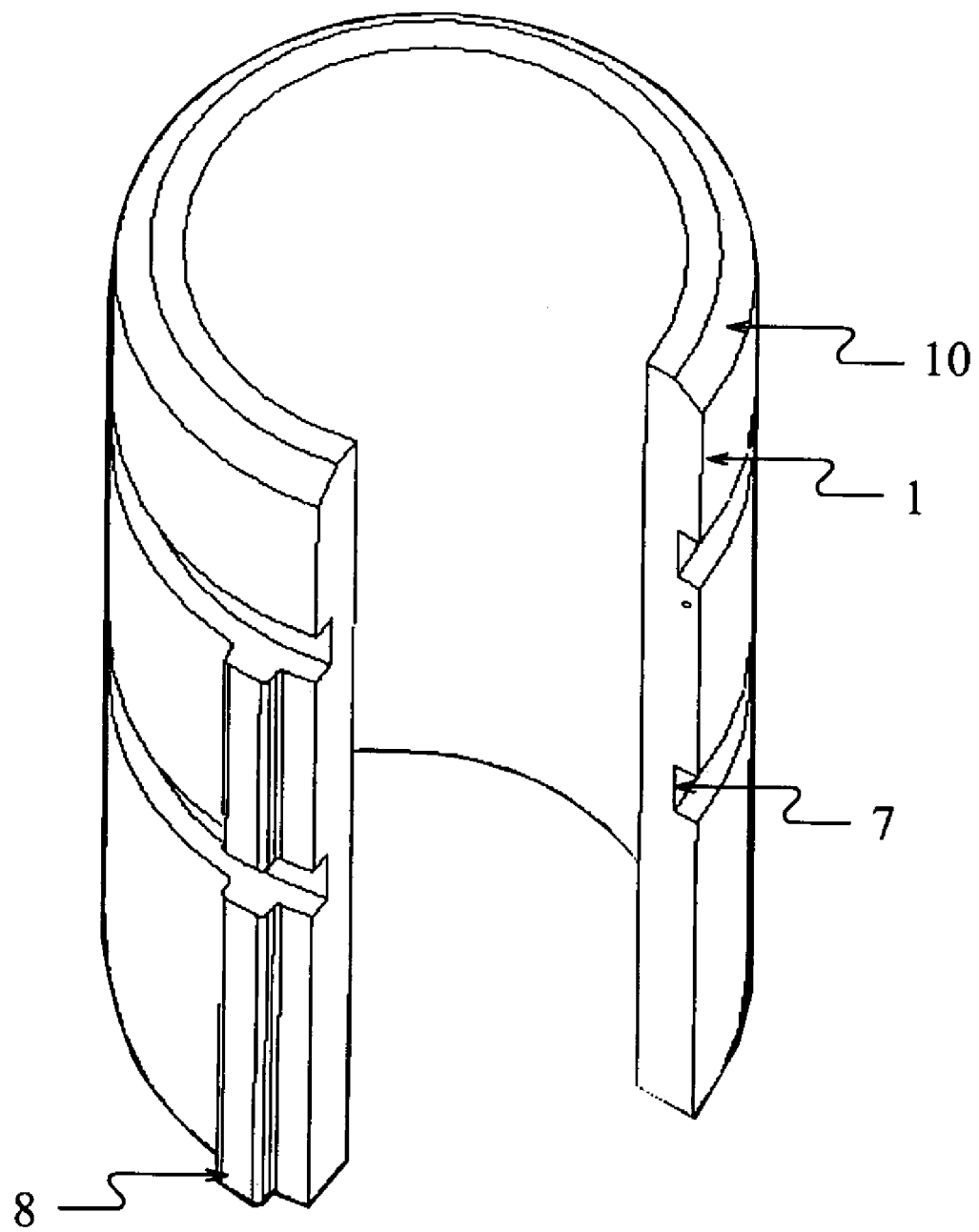
Figure : 9

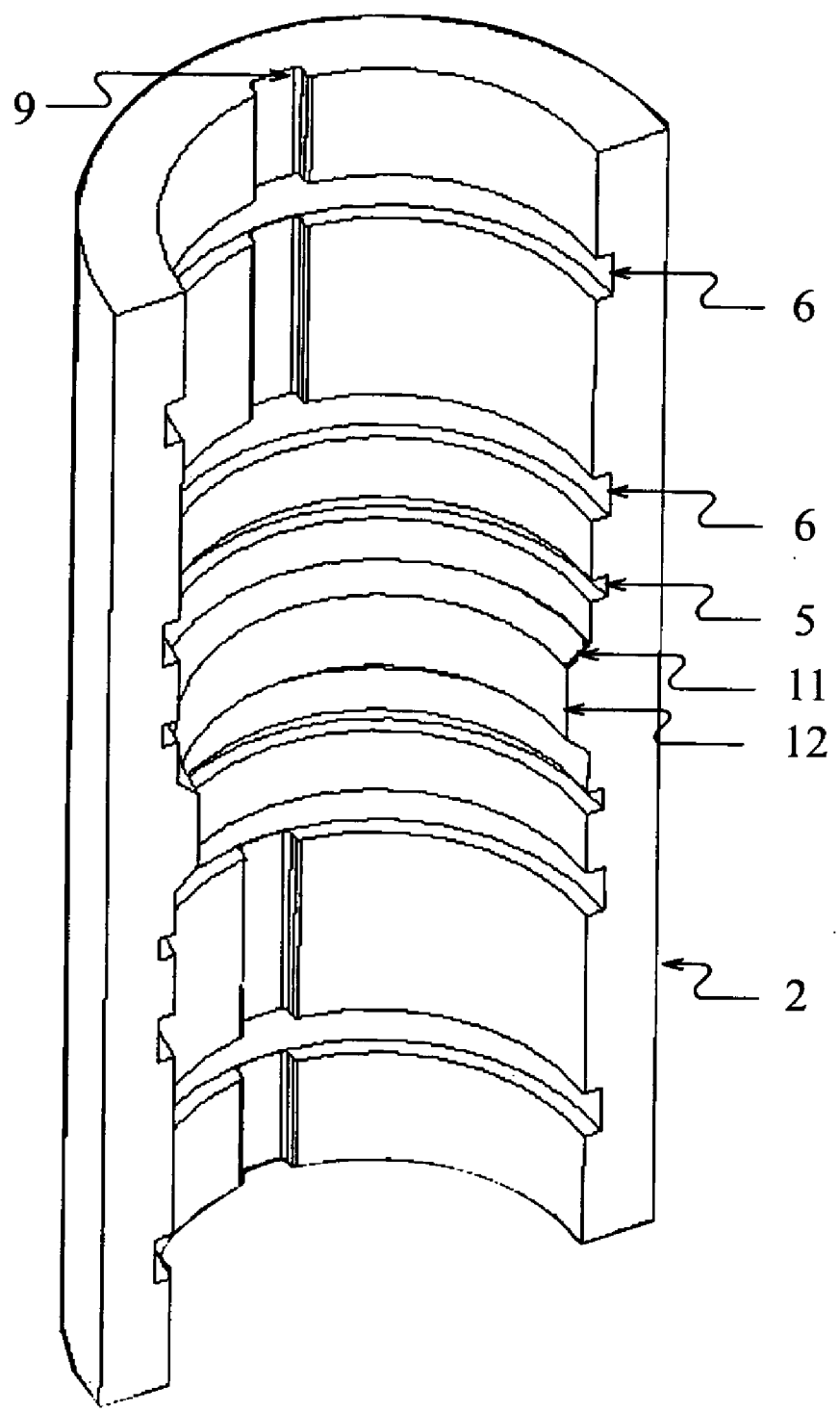
Figure : 10

LOCKING PIPE JOINT AND A METHOD OF MAKING THE SAME

CROSS-REFERENCE TO RELATED APPLICATION

To the fullest extent permitted by law, the present U.S. Non-Provisional Patent Application is a U.S. National Phase Filing of and with priority to Patent Cooperation Treaty Application No. PCT/IN2007/000406, entitled "A Novel Locking Pipe Joint And A Method Of Making The Same," filed on behalf of inventors, Narayan Swamy Subbaraman, Jaikishan Pohumal Wadhwani and Ajit Bhavarlal Jain and applicant, Jain Irrigation Systems Limited on Sep. 10, 2007, which claims priority to and the benefit of Indian Provisional patent application entitled "A Novel Pipe Locking Joint," filed on behalf of inventors, Narayan Swamy Subbaraman, Jaikishan Pohumal Wadhwani and Ajit Bhavarlal Jain and applicant, Jain Irrigation Systems Limited, on Sep. 26, 2006, and having assigned Serial No. 1560/MUM/2006.

FIELD OF INVENTION

The invention generally relates to joints in pipe. In particular it relates to joints that are subjected to conditions of thrust and rotation.

BACKGROUND OF INVENTION

Galvanised iron (GI) has long been used to make delivery pipes for carrying water from submersible pumps. Pipe systems that deliver water from deep bore wells are designed so that the system, which essentially comprises pipes and joints, should:

Withstand the submersible pump's dead weight, the pressure developed by the pump, the reverse thrust created by the upward flow of water, and the water hammer effect created by the start/stop operations of the pump.
Withstand the torque developed by the start/stop operations of the pump
Be corrosion resistant
Be easy to install and dismantle in field
Minimize the friction losses
Be cost effective.

The conventional GI pipes normally satisfy the first two stress-related requirements, that is, that of withstanding the various forces and stresses applied to them. However, all GI pipes, including steel ones, are susceptible to chemical corrosion. Various factors such as pH, and levels of dissolved oxygen (DO), hydrogen sulphide, total dissolved solids, $CO_2$, dissolved iron, and dissolved manganese, contribute to chemical corrosion of GI pipes. Galvanic corrosion in galvanized pipes, which are bi-metal in constitution, is caused by high level of total dissolved solids in water.

Steel pipes are typically of high specific gravity. This makes the pipes and related accessories and also the handling equipment heavy, which ultimately makes it difficult to handle and also expensive.

Another disadvantage of the GI pipes is that the pipe system requires special sealants in the form of chemicals or Teflon tape in order to make joints in the system leak-proof.

A further disadvantage of the GI pipes is that their inner surface is rough which leads to greater friction losses. During the life of the GI pipes, the inside surface gets pitted or deposited with carbonates, thereby leading to an increase in the friction losses in the pipe, ultimately resulting in reduced discharge.

The pitting of the inside surface of the GI pipes also necessitates their frequent replacement increasing the maintenance cost of the system.

A further disadvantage resulting from the friction losses is that the pumps have to operate at higher dynamic head, which reduces the effective life of the pump and increases the energy consumption.

There have been attempts to provide a PVC pipe-based system in an effort to eliminate the various drawbacks and disadvantages of the GI pipe system. Systems made from plastic are available, however these systems are normally not able to satisfactorily withstand the forces and stresses put on them under the field conditions, more specifically the stresses generated due to the submersible pump's dead weight, the pressure developed by the pump, the reverse thrust created by the upward flow of water, and the water hammer effect created by the start/stop operations of the pump, and the torque developed by the start/stop operations of the pump.

Some attempts have been made to resolve this problem by developing joints made from pipes that have special threads. However their drawback is that although they are able to withstand the unidirectional torque, under the bi-directional torque or the torque that changes direction, they are not effective and the joints do not remain locked. Moreover, the threads of the plastic joints wear out more quickly than metal threads during the maintenance or repair operations.

There have been attempts to resolve the problem of joint unlocking by providing metallic wires in the threaded joints. The approach here has been to resolve the problem of joints unlocking under the bi-directional torque conditions. The factory fitted joints do resist the bidirectional torque; however, the field-fitted joints loosen under the field conditions. Moreover, even here the problem of thread wear-out persists.

Pipe joint systems that eliminated threads are available. In one such system, grooves and locking screws are provided. Grooves are provided on the OD of the pipe and ID of the coupler. This forms a passage through which spline intended for resisting tensile stresses is placed. Screws are provided for torque resistance. However, the drawback of these joints is that the screws loosen under the field operating conditions. This leads to rotation of pipes inside the coupler resulting in winding of the cable around the pipe and finally breakage of the cable. Also, it is found that the screws tend to damage the pipes themselves.

There is therefore a need to provide a system of joints that will withstand the stresses and forces imposed on a pipe system carrying fluids during field conditions.

OBJECTS AND ADVANTAGES

Accordingly the objects and advantages of the present invention are as described below.

An object of the present invention is to provide a lock joint that will:

Withstand the submersible pump's dead weight, the pressure developed by the pump, the reverse thrust created by the upward flow of water, and the water hammer effect created by the start/stop operations of the pump.
Withstand the torque developed by the start/stop operations of the pump
Be corrosion resistant
Be easy to install and dismantle in field
Minimize the friction losses
Be cost effective.

BRIEF DESCRIPTION OF FIGURES

FIG. 1 shows the longitudinal and cross sections of the assembly showing the coupler joined with two ends of the pipe.

FIG. 2 shows the longitudinal and cross sections of two ends of the pipe with external ribs which are to be joined by coupler.

FIG. 3 shows the longitudinal and cross sections of the coupler before joining the pipe ends.

FIG. 4 shows a cross section through the coupler with the sealing ring in assembled position.

FIG. 5 shows the condition of spline in assembled position residing in the groove partially in coupler and partially on pipe.

FIG. 7 shows the outer view of the joint when coupler is fixed to both the ends.

FIG. 6 shows the sectional view of tangential holes made in coupler.

FIG. 8 shows cut open isometric view of the pipes/coupler assembly

FIG. 9 shows cut open isometric view of the part of the pipe near its jointed end FIG. 10 shows cut open isometric view of the coupler

SUMMARY OF THE INVENTION

The present invention provides a novel locking pipe joint for use in fluid-carrying pipe systems. The joint is constructed on a push-fit principle. Sealing rings are used to make the joint leak-proof. Splines are provided to sustain the longitudinal forces imposed on the joint, and longitudinal ribs are provided on the outer surface of the jointed pipes to withstand the torsional loads. The joint is simple in its construction, easy to assemble in field and cost effective.

| List of parts: | | | |
|---|---|---|---|
| Part No. | Name | Part No. | Name |
| 1 | Pipe | 2 | Coupler |
| 3 | Sealing Ring | 4 | Spline |
| 5 | Sealing Ring Groove (also referred to as second groove) | 6 | Spline Groove inside the Coupler (also referred to as third groove) |
| 7 | Spline Groove at the Pipe End (also referred to as first groove) | 8 | Rib on the pipe OD |
| 9 | Passage in the coupler ID | 10 | Chamfer on the pipe OD (also referred to as first chamfer) |
| 11 | Chamfer on the coupler (also referred to as second chamfer) | 12 | Coupler ID |
| 13 | Holes | | |

DETAILED DESCRIPTION OF THE PRESENT INVENTION

The present invention describes a novel joint for fluid-carrying pipes and a method of making the same. The invention provides a leak-proof joint that is particularly suitable where the pipe system has to withstand tensile, compressive, and torsional forces, or any combination thereof.

The most preferred embodiment of the invention is now described.

In the preferred embodiment of the present invention, two pipes 1 are connected using a coupler 2. This is shown in FIG. 1. The preferred embodiment further comprises a novel sealing and locking arrangement that will withstand any longitudinal and torsional forces in the field situations. The arrangement comprises provision of sealing rings to prevent fluid leakage, and ribs and splines to provide locking against movement.

A novel feature of the present invention is the ribs provided on pipes. Instead of using pipes with plain outer surface, as is the current practice in the related industry, the inventors have advantageously used pipes 1 with ribs 8 on their outer surface. The ribs 8 are formed as a part of the pipe extrusion process. The coupler 2 has corresponding passages 9 on its inside surface, wherein the ribs 8 fit snugly. The inventors have found that the ribs 8 advantageously secure the pipes against the rotational movement. Additionally the invention provides a spline 4 that is inserted into and held in place within the space created between the groove 6 and groove 7 provides on the coupler inside surface and pipe outside surface, respectively.

A typical rib 8 is interrupted near the jointing end of the pipe in order to facilitate passage of spline 4.

As a further novel feature of the present invention, a sealing ring 3 is placed inside the sealing ring groove 5 that is made on the inside surface of the coupler 2 near the near ends of the pipes 1 to be jointed.

FIG. 2 shows a longitudinal cross section of the pipe 1 taken through a typical rib 8. In order that the pipes 1 are situated securely inside the coupler 2, a chamfer 10 is provided at the end of each pipe 1 to be jointed, which matches the chamfer 11 provided on the inside surface of the coupler 2. FIG. 3 shows a longitudinal cross section through the coupler showing relative positions of the sealing groove 5, spline groove 6, passage 9 for ribs 8, chamfer 11, and the effective reduced diameter 12 of the coupler. The reduced diameter 12, acts as a stopper for the longitudinal movement of jointed pipes 1 towards each other.

FIG. 4 shows a cross-sectional view taken through the sealing ring 3 inside the assembled joint showing the pipe 1 and the coupler 2.

FIG. 5 shows the cross-sectional view taken through the spline 4 inside the assembled joint showing the pipe 1, and the coupler 2.

FIG. 6 shows the cross-sectional view showing the tangential holes 13, made for insertion/removal of the spine 4, connecting the groove 6, made at the inner surface of the coupler with the outer surface.

To construct the joint disclosed in the preferred embodiment, a sealing ring 3 is placed inside the coupler 2 in its groove 5 on each side of the stopper created by the reduced diameter 12 of the coupler 2. Ribbed pipes 1 are then situated so that the ribs 8 fit inside their respective grooves 9 provided on the inside surface of the coupler 2. Pipes 1 are then press-fitted on each side of the stopper to ensure a snug fit. A single spline 4 is inserted into one end of the hole 13 provided for this purpose, so that it comes out at the other end. Two ends of the spline 4 that is in place its respective groove, are twisted and spline 4 is thus secured in its place. The ribs 8 ensure that the pipes remain held in place under the torsional forces. The resultant joint is resistance to torque and is leak-proof.

The joint is assembled on field with great ease. As the materials are light weight and the components simple in their structure, the operation is straightforward. As the holes 13 for the spline 4 are placed at predetermined locations, insertion of spline 4 therein can be carried out in difficult conditions such as insufficient light. A further advantage of the joint described in the present invention is that it is leak-proof and also resistant to the longitudinal and torsional forces.

Several embodiments of the present invention are possible. In one embodiment, a plurality of ribs is provided on the outer surface of the pipes. Corresponding grooves are provided on the inner surface of the coupler.

In another embodiment, a plurality of sealing rings is provided. Corresponding cuts or interruptions are provided on all ribs, and corresponding grooves are provided on the inside surface of the coupler.

In yet another embodiment, a plurality of splines is provided. Corresponding holes are provided on the coupler and corresponding grooves are provided on the outer surface of the pipes and inner surface of the coupler.

The inventors have found that the novel locking pipe joint described in the present invention has the advantages that it:
- Withstands the submersible pump's dead weight, the pressure developed by the pump, the reverse thrust created by the upward flow of water, and the water hammer effect created by the start/stop operations of the pump.
- Withstands the torque developed by the start/stop operations of the pump
- Is corrosion resistant
- Is easy to install and dismantle in field
- Minimizes the friction losses
- Is cost effective.

While the above description contains many specificities, these should not be construed as limitation in the scope of the invention, but rather as an exemplification of the preferred embodiments thereof. Many other variations are possible. Accordingly, the scope of the invention should be determined not by the embodiments illustrated, but by the appended claims and their legal equivalents.

In view of the detailed foregoing description of the present invention, it will be apparent to a person skilled in the art that the present invention basically comprises the following items:

1. A novel locking pipe joint comprising a pair of pipes, a coupler, a plurality of sealing rings and a plurality of splines, wherein each of said pair of pipes further comprises:
   a. a plurality of longitudinal ribs on its outside surface,
   b. a first chamfer at its jointed end, the jointed end being the end of the pipe that is inserted into said coupler,
   c. a plurality of first grooves, wherein each of said plurality of first grooves is provided to house one of said plurality of splines,
   wherein said coupler comprises on its inside surface:
   d. a plurality of second grooves, wherein each plurality of second grooves is provided to house one of said plurality of sealing rings,
   e. for each of said pair of pipes a plurality of longitudinal grooves; wherein each of said plurality of longitudinal groove corresponds to one of said plurality of longitudinal ribs,
   f. a pair of second chamfers, each of said pair of second chamfers fitting snugly against said first chamfer of one of said pair of pipes; wherein the two second chamfers together form a section of reduced diameter inside said coupler; and
   g. for each one of said pair of pipes a plurality of third grooves, the number of said plurality of third grooves for each of said pair of pipes being same as the number of said plurality of first grooves for the pipe, and each of said plurality of third grooves being positioned respectively with the position of each of said plurality of first grooves such that each first groove and the corresponding third groove together form a corresponding spline passage, thereby forming a plurality of spline passages; and
   h. corresponding to each of said plurality of third grooves, a pair of tangential holes; said holes being made in the coupler wall and positioned near each other, and
   wherein one of said plurality of sealing rings is placed in each of said sealing ring grooves, so that all said second grooves are fitted with a sealing ring, and
   whereafter each of said pair of pipes is placed inside said coupler from either end of said coupler such that each of said plurality of longitudinal ribs fits inside one of corresponding said plurality of longitudinal grooves, and whereby each of said plurality of sealing ring gets compressed inside a corresponding second groove, and further whereby said first chamfer for each of said pair of pipes rests on corresponding said second chamfer; and
   wherein said tangential holes are made in the wall of said coupler such that each said tangential hole opens into a spline passage; the number of said plurality of pairs of tangential holes being the same as the number of spline passages; and
   wherein each of said plurality of splines is inserted into one hole of each of said plurality of pairs tangential holes, the spline further entering into the corresponding spline passage and coming out of the other hole of the corresponding pair of tangential holes; both loose ends of the spine being twined together forming a secure tie; said secure tie being formed at each of said plurality of spline passages using one of said plurality of splines; and
   whereby a leak-proof and secure locking pipe joint is formed.

2. A novel locking pipe joint as described in item 1, wherein the number of said passages is one, and wherein the number of sealing rings and number of second grooves on each of said coupler is one.

3. A novel locking pipe joint as described in any of items 1 and 2, wherein the cross-sectional shape of said longitudinal ribs is any curvilinear shape, preferably rectangular, and wherein the cross-sectional shape of the corresponding said longitudinal grooves is matching to fit corresponding longitudinal ribs, so that said longitudinal ribs fit snugly inside their corresponding said grooves.

4. A novel locking pipe joint as described in any of items 1 to 3, wherein the number of said longitudinal ribs is one.

5. A novel locking pipe joint as described in any of items 1 to 4, wherein the material used for said pipes and said couplers is selected from the group comprising, metals, wood, plastic, polymers, or any combination thereof.

6. A novel locking pipe joint as described in any of items 1 to 5, wherein a the number of said sealing rings and the number of said second grooves for each of said pipes is one.

7. A novel locking pipe joint as described in any of items 1 to 6, wherein a the number of said spline passages and the number of said splines is one.

8. A novel locking pipe joint as described in any of claims 1 to 7, wherein the number of said plurality of first and third grooves is at least one.

9. A method of making a novel locking pipe joint comprising the steps of:
   A. providing a pair of pipes, a coupler, a plurality of sealing rings and a plurality of splines, wherein each of said pair of pipes further comprises:
      i. a plurality of longitudinal ribs on its outside surface,
      j. a first chamfer at its jointed end, the jointed end being the end of the pipe that is inserted into said coupler, k. a plurality of first grooves, wherein each of said plurality of first grooves is provided to house one of said plurality of splines, wherein said coupler comprises on its inside surface the following parts:

l. a plurality of second grooves, wherein each plurality of second grooves is provided to house one of said plurality of sealing rings, m. for each of said pair of pipes a plurality of longitudinal grooves; wherein each of said plurality of longitudinal groove corresponds to one of said plurality of longitudinal ribs, n. a pair of second chamfers, each of said pair of second chamfers fitting snugly against said first chamfer of one of said pair of pipes; wherein the second chamfers together form a section of reduced diameter inside said coupler; and o. for each one of said pair of pipes a plurality of third grooves, the number of said plurality of third grooves for each of said pair of pipes being same as the number of said plurality of first grooves for the pipe, and each of said plurality of third grooves being positioned respectively with the position of each of said plurality of first grooves in order that each first groove and the corresponding third groove together form a corresponding spline passage, thereby forming a plurality of spline passages; and p. corresponding to each of said plurality of third grooves, a plurality of pairs of tangential holes; said holes being made in the coupler wall and positioned near each other, and wherein said tangential holes are made in the wall of said coupler such that each said tangential hole opens tangentially into a spline passage; the number of said plurality of pairs of tangential holes being the same as the number of spline passages; and B. placing each of said plurality of sealing rings into a corresponding second groove, C. placing each of said pair of pipes, inside said coupler from either end of said coupler such that each of said plurality of longitudinal ribs fits inside one of corresponding said plurality of longitudinal grooves, and whereby each of said plurality of sealing ring gets compressed inside a corresponding second groove, and further whereby said first chamfer for each of said pair of pipes rests on corresponding said second chamfer; and D. inserting each of said plurality of splines into one hole of each of said plurality of pairs tangential holes, the spline further entering into the corresponding spline passage and coming out of the other hole of the corresponding pair of tangential holes;

E. twining together both loose ends of the spine to form a secure tie; said secure tie being formed at each of said plurality of spline passages using one of said plurality of splines;

whereby a leak-proof and secure locking pipe joint is formed.

While the above description contains many specificities, these should not be construed as limitation in the scope of the invention, but rather as an exemplification of the preferred embodiments thereof. Many other variations are possible. Accordingly, the scope of the invention should be determined not by the embodiments illustrated, but by the appended claims and their legal equivalents.

The invention claimed is:

1. A novel locking pipe joint comprising a pair of pipes, a coupler, a number of sealing rings and a number of splines, wherein each of said pair of pipes further comprises:

a. a number of longitudinal ribs on its outside surface, b. a first chamfer at its jointed end, the jointed end being the end of the pipe that is inserted into said coupler, c. a number of first grooves, wherein each of said number of first grooves is provided to house one of said number of splines, wherein said coupler comprises on its inside surface:

d. a number of second grooves, wherein each number of second grooves is provided to house one of said number of sealing rings, e. a number of longitudinal grooves; wherein each of said number of longitudinal grooves corresponds to one of said number of longitudinal ribs, f. a pair of second chamfers, each of said pair of second chamfers fitting snugly against said first chamfer of one of said pair of pipes; wherein the two second chamfers together form a section of reduced diameter inside said coupler; and g. a number of third grooves, the number of said third grooves for each of said pair of pipes being a same as the number of said first grooves for the pipe, and each of said number of third grooves being positioned respectively with the position of each of said number of first grooves such that each first groove and the corresponding third groove together form a corresponding spline passage, thereby forming a number of spline passages; and h. corresponding to each of said number of third grooves, a number of pairs of tangential holes; said holes being made in the coupler wall and positioned near each other, and wherein one of said number of sealing rings is placed in each of said sealing ring grooves, so that all second grooves are fitted with a sealing ring, and whereafter each of said pair of pipes is placed inside said coupler from either end of said coupler such that each of said number of longitudinal ribs fits inside one of corresponding said number of longitudinal grooves, and whereby each of said number of sealing ring gets compressed inside a corresponding second groove, and further whereby said first chamfer for each of said pair of pipes rests on corresponding said second chamfer; and wherein said tangential holes are made in the wall of said coupler such that each said tangential hole opens into a spline passage; the number of said pairs of tangential holes being the same as the number of spline passages; and wherein each of said number of splines is inserted into one hole of each of said plurality of pairs tangential holes, the spline further entering into the corresponding spline passage and coming out of the other hole of the corresponding pair of tangential holes; both loose ends of the spine being twined together forming a secure tie; said secure tie being formed at each of said plurality of spline passages using one of said plurality of splines; and whereby a leak-proof and secure locking pipe joint is formed.

2. The novel locking pipe joint as claimed in claim 1, wherein the number of said spline passages is one, and wherein the number of sealing rings and number of second grooves on each of said coupler is one.

3. The novel locking pipe joint as claimed in claim 2, wherein the cross-sectional shape of said longitudinal ribs is curvilinear shape and wherein the cross-sectional shape of the corresponding said longitudinal grooves is matching to fit corresponding longitudinal ribs, so that said longitudinal ribs fit snugly inside their corresponding said grooves.

4. The novel locking pipe joint as claimed in claim 3, wherein the number of said longitudinal ribs is one.

5. The novel locking pipe joint as claimed in claim 4, wherein the material used for said pipes and said couplers is selected from the group comprising, metals, wood, plastic, polymers, or any combination thereof.

6. The novel locking pipe joint as claimed in claim 5, wherein the number of said sealing rings is one and the number of said second grooves for each of said pipes is one.

7. The novel locking pipe joint as claimed in 6, wherein the number of said spline passages and the number of said splines is one.

8. The novel locking pipe joint as claimed in claim 7, wherein the number of first and third grooves is at least one.

9. The novel locking pipe joint as claimed in claim 3, wherein the cross-sectional shape of said longitudinal ribs is rectangular.

10. A method of making a novel locking pipe joint comprising the steps of:
  A. providing a pair of pipes, a coupler, a plurality of sealing rings and a plurality of splines, wherein each of said pair of pipes further comprises:
    a. a plurality of longitudinal ribs on its outside surface,
    b. a first chamfer at its jointed end, the jointed end being the end of the pipe that is inserted into said coupler,
    c. a plurality of first grooves, wherein each of said plurality of first grooves is provided to house one of said plurality of splines, wherein said coupler comprises on its inside surface:
    d. a plurality of second grooves, wherein each plurality of second grooves is provided to house one of said plurality of sealing rings,
    e. for each of said pair of pipes a plurality of longitudinal grooves; wherein each of said plurality of longitudinal groove corresponds to one of said plurality of longitudinal ribs,
    f. a pair of second chamfers, each of said pair of second chamfers fitting snugly against said first chamfer of one of said pair of pipes; wherein the second chamfers together form a section of reduced diameter inside said coupler; and
    g. for each one of said pair of pipes a plurality of third grooves, the number of said plurality of third grooves for each of said pair of pipes being same as the number of said plurality of first grooves for the pipe, and each of said plurality of third grooves being positioned respectively with the position of each of said plurality of first grooves in order that each first groove and the corresponding third groove together form a corresponding spline passage, thereby forming a plurality of spline passages; and
    h. corresponding to each of said plurality of third grooves, a plurality of pairs of tangential holes; said holes being made in the coupler wall and positioned near each other, and wherein said tangential holes are made in the wall of said coupler such that each said tangential hole opens tangentially into a spline passage; the number of said plurality of pairs of tangential holes being the same as the number of spline passages; and
  B. placing each of said plurality of sealing rings into a corresponding second groove,
  C. placing each of said pair of pipes inside said coupler from either end of said coupler such that each of said plurality of longitudinal ribs fits inside one of corresponding said plurality of longitudinal grooves, and whereby each of said plurality of sealing ring gets compressed inside a corresponding second groove, and further whereby said first chamfer for each of said pair of pipes rests on corresponding said second chamfer; and
  D. inserting each of said plurality of splines into one hole of each of said plurality of pairs tangential holes, the spline further entering into the corresponding spline passage and coming out of the other hole of the corresponding pair of tangential holes;
  E. twining together both loose ends of the spine to form a secure tie; said secure tie being formed at each of said plurality of spline passages using one of said plurality of splines; whereby a leak-proof and secure locking pipe joint is formed.

* * * * *